(No Model.)

E. A. LEFEBRE, Jr.
BICYCLE SUPPORT.

No. 556,758.  Patented Mar. 24, 1896.

WITNESSES:
M. B. Harris
L. M. Muller

INVENTOR
Edward A. Lefebre, Jr.
BY
Edgar Tate & Co
ATTORNEYS

UNITED STATES PATENT OFFICE.

EDWARD A. LEFEBRE, JR., OF BROOKLYN, NEW YORK, ASSIGNOR, BY DIRECT AND MESNE ASSIGNMENTS, TO THE LEFEBRE MANUFACTURING COMPANY, OF NEW YORK.

BICYCLE-SUPPORT.

SPECIFICATION forming part of Letters Patent No. 556,758, dated March 24, 1896.

Application filed August 6, 1895. Serial No. 558,376. (No model.)

*To all whom it may concern:*

Be it known that I, EDWARD A. LEFEBRE, Jr., a citizen of the United States, and a resident of Brooklyn, in the county of Kings and State of New York, have invented certain new and useful Improvements in Bicycle-Supports, of which the following is a specification, reference being had to the accompanying drawings, forming a part thereof, in which similar letters of reference indicate corresponding parts.

This invention relates to supports for bicycles, and the object thereof is to provide a device of this class which is simple in construction and operation, and which will support a bicycle in an upright position when not in use.

The invention is fully disclosed in the following specification, of which the accompanying drawings form a part, in which—

Figure 1:
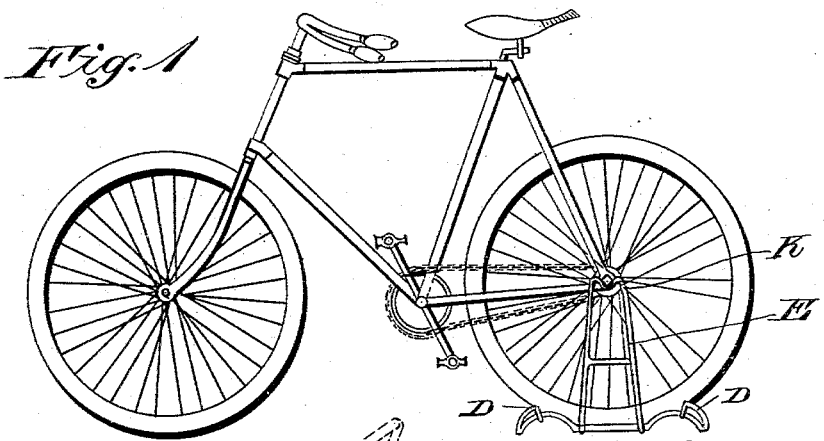
Figure 2:
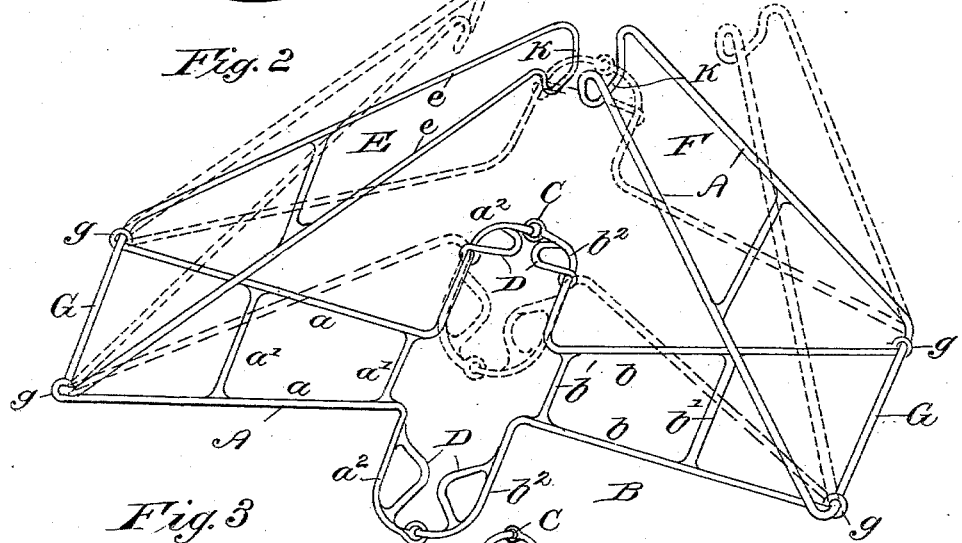

Figure 1 is a side elevation of a bicycle held in an upright position by my improved support; Fig. 2, a perspective view of the support, the parts thereof being shown in full lines in the position occupied thereby when supporting a bicyle, and also in dotted lines showing the method of folding the same; and Fig. 3 a plan view of the device with the hinged sides thereof folded over the base.

In the practice of my invention I provide a bicycle-support which consists of four frames, which are hinged together, and each of which is composed preferably of wire. The two central hinged frames constitute the base of the support when in position for use, and the end frames which are hinged thereto constitute the sides of the support and operate in connection with the axle of one of the wheels of the bicycle, as hereinafter described.

Figure 3:
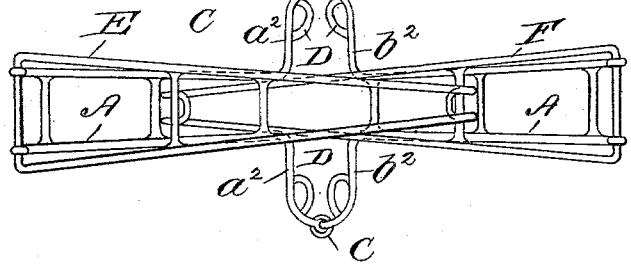

Referring to Fig. 3 of the drawings, A and B represent the central frames of my improved bicycle-support, which are hinged together at C. These frames A and B are composed of side bars $a$ and $b$, respectively, and the cross-bars $a'$ and $b'$ and the inner or hinged ends thereof are formed into semiloops or yokes, as shown at $a^2$ and $b^2$, the outer ends of these semiloops or yokes being pivotally connected, as shown at C, and formed on the inner side of each of the semiloops or yokes are inwardly-directed loop-shaped extensions D, all of which is clearly shown in Fig. 2, the object of these loops D, which are arranged on each side adjacent to the pivotal connections C, being to form blocks or chucks for the wheel to prevent the backward or forward movement thereof when the support is in position, as shown in Fig. 1. The ends of the side frames E and F are also composed of side wires $e$ and $f$, respectively, which are united at the base by means of transverse rods G, which are pivotally connected with the outer ends of the central or base frames, as shown at $g$, and the upper or outer ends of these side frames are provided with inwardly-directed loops K, which are adapted to rest or fit under the ends of the axle of one of the wheels of the bicycle and securely support the same, as shown in Fig. 1. In practice these loops, which may be of any desired form, are so constructed as to receive therein the ends of the axle or the nuts mounted thereon, and to form a secure rest or support therefor.

When constructed as hereinbefore described the separate forms of my improved bicycle-support may be folded together, the central frames A and B being folded side by side, and the end or outer frames E and F being folded adjacent to and in contact with the central frames, and by means of this arrangement it will be seen that the entire device may be folded into a compact form, which does not occupy much space, and which may be readily carried with the machine and secured to the frame or one of the rods thereof, if desired, or the said support may be carried on the person of the operator of the machine, if desired.

It will also be seen that the outer ends of the central frames, A and B, and the adjacent ends of the side frames, E and F, are wider at their pivotal connection than at the free or top ends of the side frames, and by this means the stability of the support when in operation is increased, and a similar result is accomplished by extending the inner ends of the central frames, A and B, by forming thereon the semiloop or yoke portions $a^2$ and $b^2$, at the outer ends of which the pivotal connection of the central or base frames is made.

When it is desired to support a bicycle, the central or base frames, A and B, are placed upon the ground beneath one of the wheels and transversely thereof in such manner that the wheel will rest in and longitudinally of the oblong portion of the support formed at the pivotal connection of the said central frames, A and B, and so that the projections D will support the wheel both at the front and rear and prevent the forward or backward movement thereof.

In Fig. 3 I have shown the side frames folded over the central or base frames; but it will be understood that this is only a partial folding of the device, and that the entire support, as shown in Fig. 3, may be again folded by means of the central pivotal connection C, and this fold is made by raising the central portion on the pivotal connection C, as shown in dotted lines in Fig. 2, when the central frames, A and B, will be folded together, and the end frames, E and F, will be folded adjacent thereto, as will be readily understood.

My invention is not limited to the exact form, combination and arrangement of the various parts thereof, as herein shown and described. The loops or semicircular curves K, by which the ends of the axle of the wheel are supported, may be of any desired form, and, if preferred, may be many-sided, so as to receive the nuts at each end of the axle, as will be readily understood, and the pivotal connection of the separate parts or frames may also be made in a different manner; and I therefore reserve the right to make all such changes in and modifications of the construction shown and described as fairly come within the scope of my invention.

Having fully described my invention, I claim and desire to secure by Letters Patent—

1. A support for bicycles composed of a bottom portion adapted to rest upon the floor and provided with laterally-extending loops and supporting frames or sides hinged at each end of said base and adapted to be connected with the drive-shaft of the bicycle, to support the same, said loops engaging the tire of the wheel to clamp and hold the wheel, substantially as described.

2. A support for a bicycle, consisting of four hinged frames, all of which are adapted to be folded together, two of which, when in use, are adapted to rest upon the ground, and the other two being adapted to be raised to substantially a vertical position and to support one of the wheels of the machine between them, substantially as shown and described.

3. A support for a bicycle, consisting of four hinged frames, all of which are adapted to be folded together, two of which, when in use, are adapted to rest upon the ground, and the other two being adapted to be raised to substantially a vertical position and to support one of the wheels of the machine between them, by means of loops formed in their upper ends, in which rest the ends of the axle of the machine, substantially as shown and described.

4. A support for a bicycle, consisting of four hinged frames, which are pivotally united at their ends, the two central frames being provided with curved extensions by which they are pivotally connected and by which an oblong transverse frame is formed, in which a wheel of a bicycle is adapted to rest, said oblong frame being provided with projections or stops by which the forward or backward movement of the wheel is prevented, and the side frames of the support, being adapted to be raised on each side of the wheel, and provided with loops or rests adapted to receive the ends of the axle of the wheel, substantially as shown and described.

In testimony that I claim the foregoing as my invention I have signed my name, in presence of the subscribing witnesses, this 2d day of August, 1895.

EDWARD A. LEFEBRE, Jr.

Witnesses:
L. M. MULLER,
F. ANDERSON.